J. W. ORROCK.
WEATHER COVER FOR TRACK SCALES.
APPLICATION FILED DEC. 6, 1920.
1,426,003.
Patented Aug. 15, 1922.
4 SHEETS—SHEET 4.
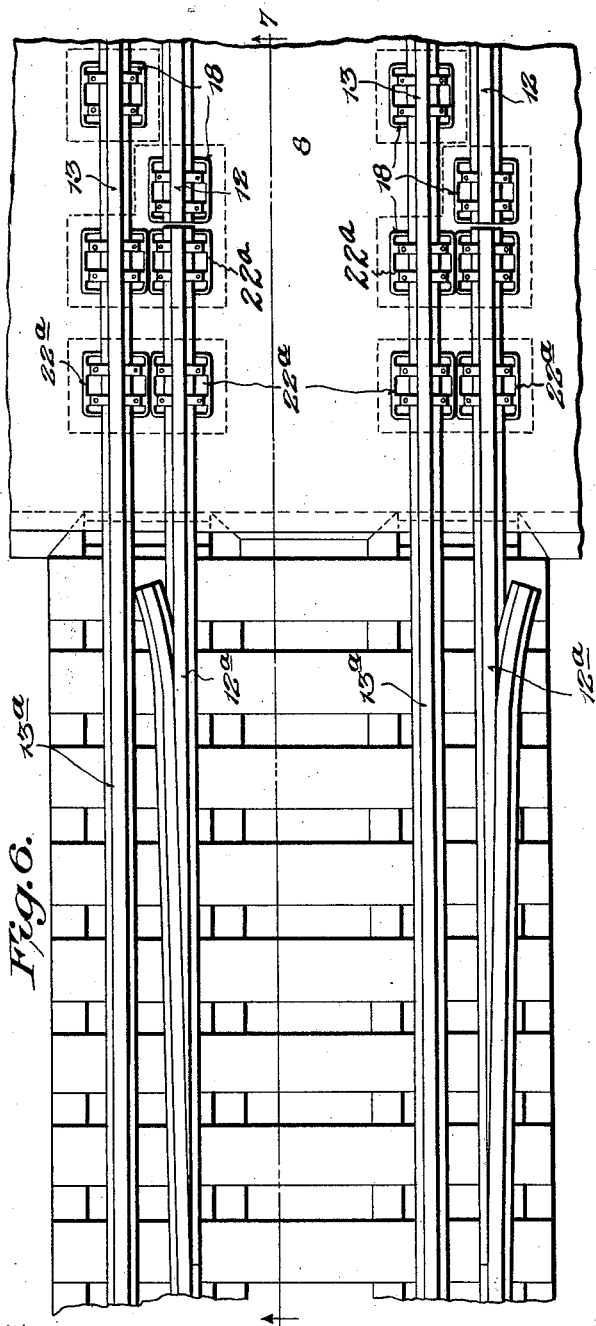
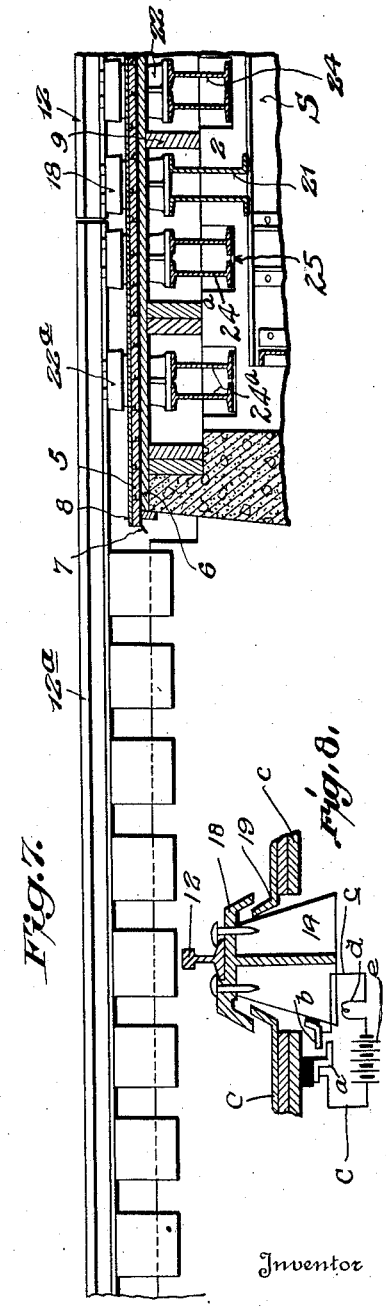
Inventor
John W. Orrock,
By
Attorney

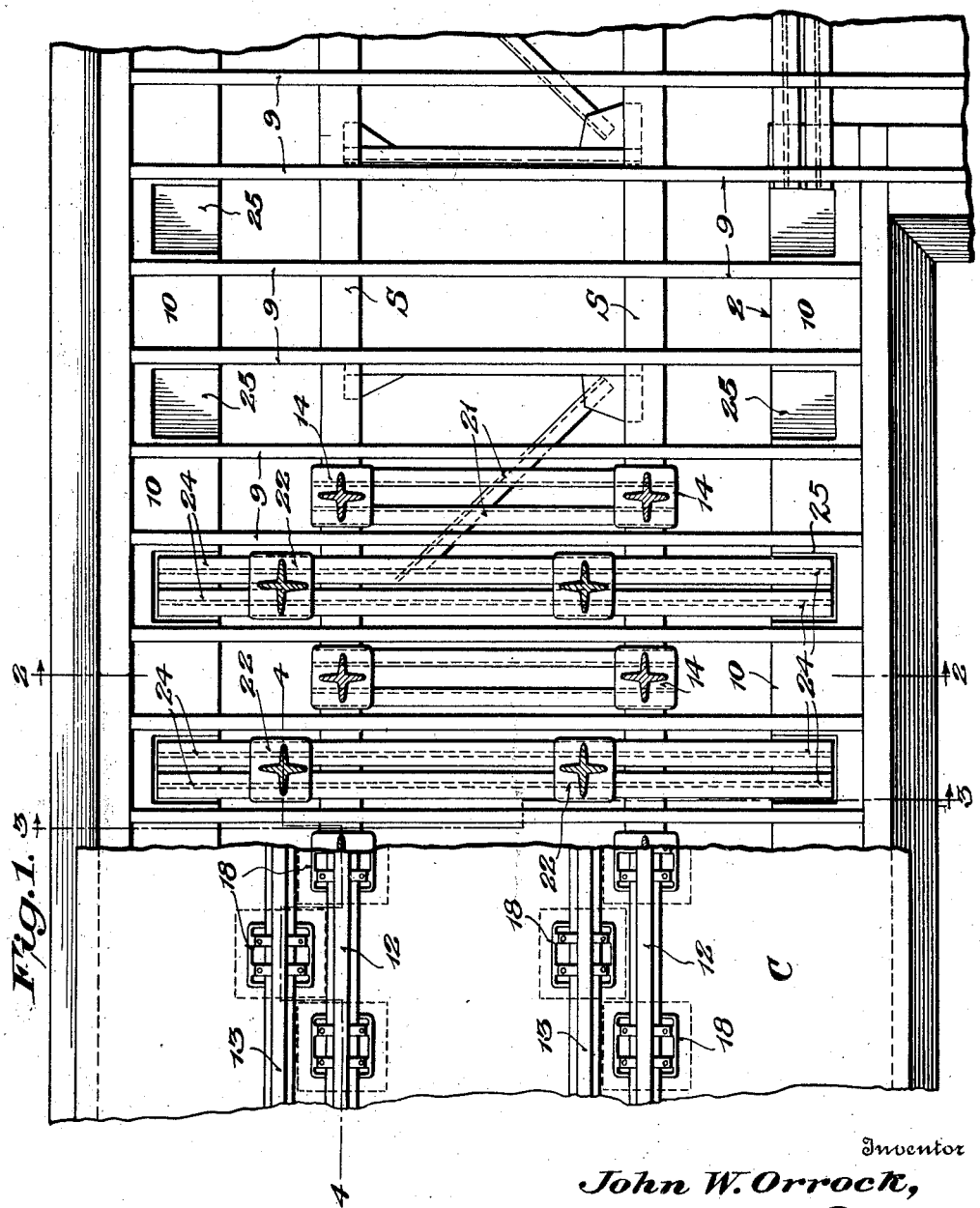

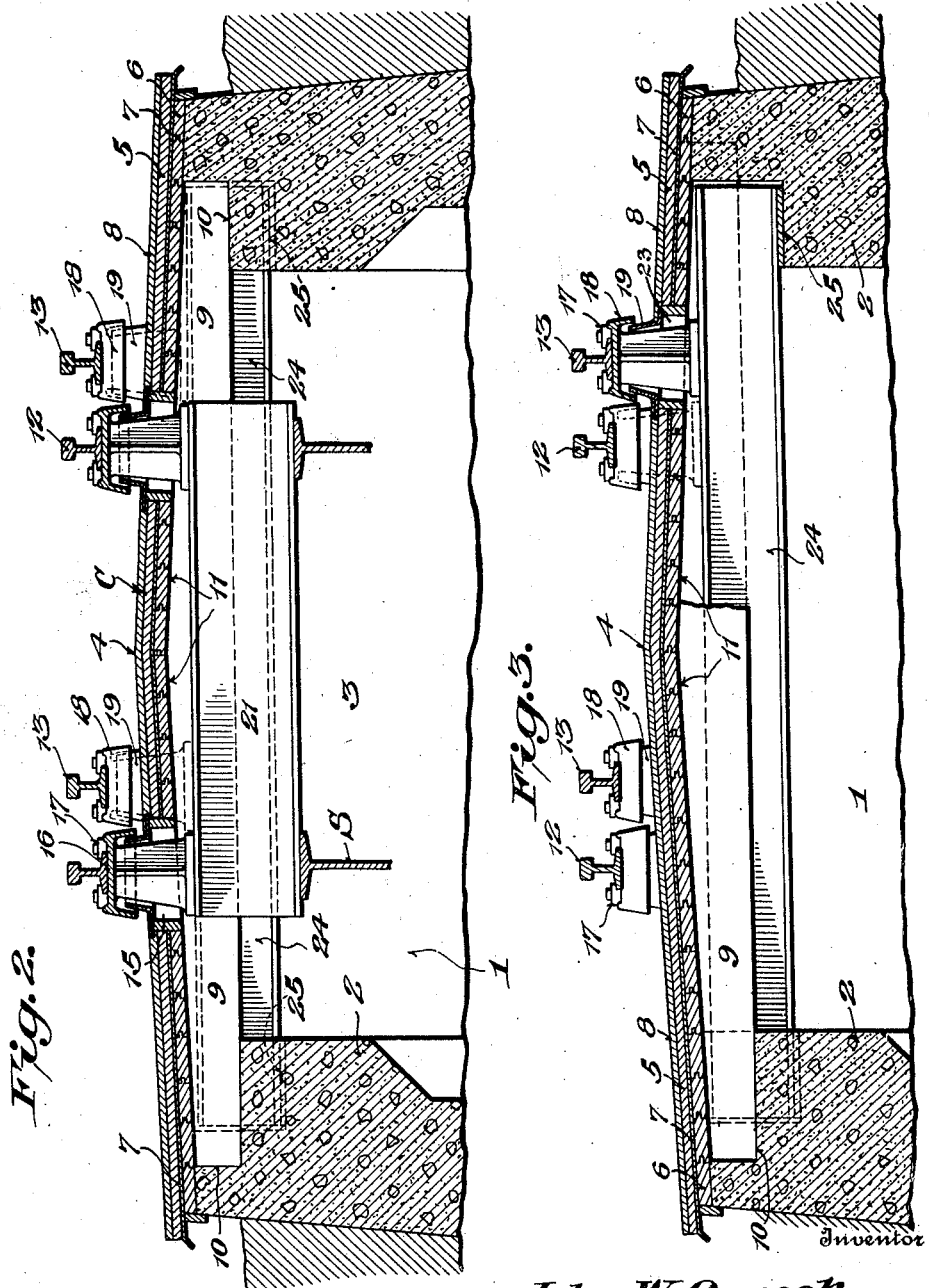

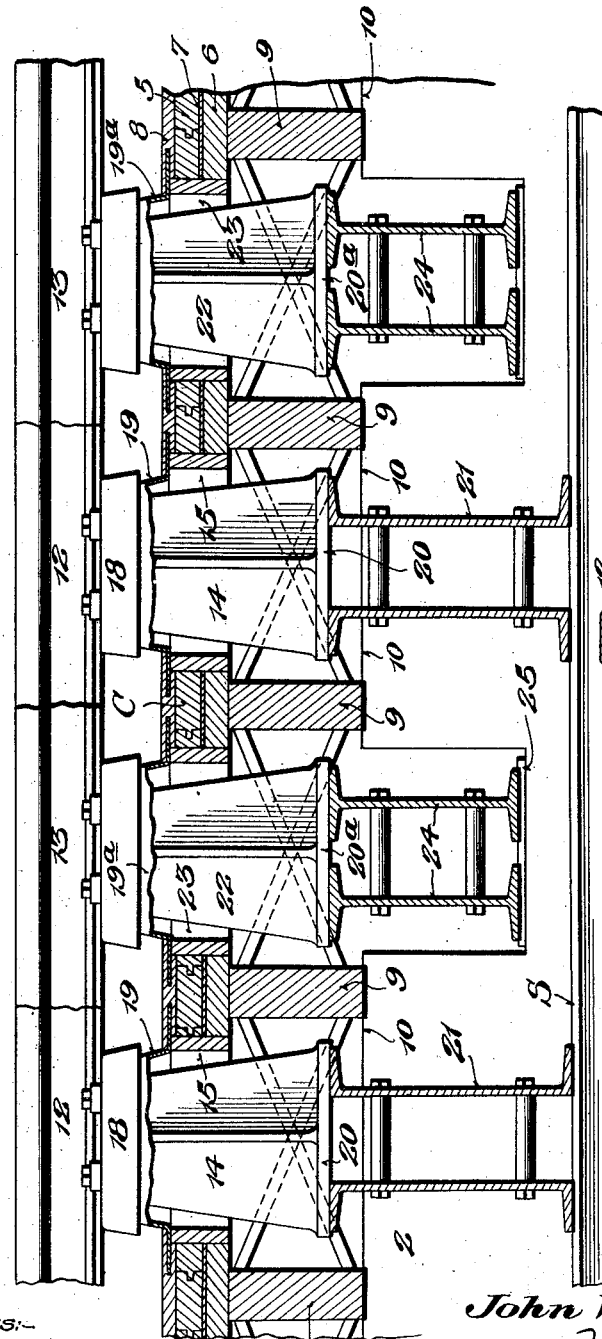
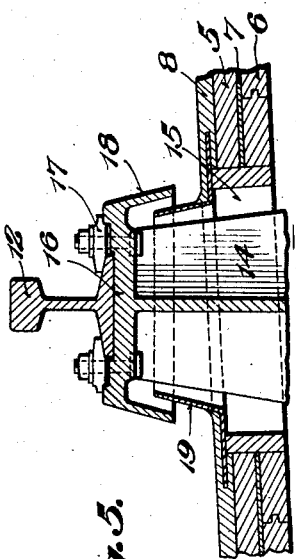

UNITED STATES PATENT OFFICE.

JOHN W. ORROCK, OF MONTREAL, QUEBEC, CANADA, ASSIGNOR OF ONE-HALF TO JOHN M. R. FAIRBAIRN, OF WESTMOUNT, QUEBEC, CANADA.

WEATHER COVER FOR TRACK SCALES.

1,426,003.   Specification of Letters Patent.   Patented Aug. 15, 1922.

Application filed December 6, 1920.  Serial No. 428,690.

*To all whom it may concern:*

Be it known that I, JOHN W. ORROCK, a subject of the King of Great Britain, residing at Montreal, in the Province of Quebec, Dominion of Canada, have invented certain new and useful Improvements in Weather Covers for Track Scales, of which the following is a specification.

This invention relates to the subject of weather protection for track scales, and particularly to an improved cover or roof structure for a scale pit combined with novel means for supporting both live and dead rail sections above the cover.

Various devices and expedients have heretofore been employed to protect the track scale from the influences of weather conditions and particularly to prevent water and foreign matter from coming into contact with working parts of the scale mechanism. In fact, the dripping of water into a scale pit and freezing on working parts of the scale mechanism has been recognized as such a serious factor in connection with the proper maintenance of track scales, that engineers have proposed many plans for protecting the scale mechanism from water. These plans have usually included drainage devices of various kinds associated with the covering of the scales, and with the stands for the track rails on the cover, but until the invention of the present applicant, no one has utilized an arched or crowned scale pit cover in combination with a novel mounting of both live and dead rails in such relation to the cover and to each other that there may be an unobstructed drainage of water beneath the live and dead rails out to the lateral edges of the cover without the use of spouts or drain collectors of any kind.

Accordingly, it is the purpose of the present invention to provide a novel weather cover structure for scales entirely obviating the objections to the devices heretofore designed and employed for track scale weather protection, and at the same time providing for the desirable feature of employing dead rail sections over the cover or roof in such a manner as to permit of the unobstructed drainage of the water beyond the sides and ends of the scale pit, and without imposing the load of the car on the cover or roof.

Therefore, a principal object of the invention is to provide a novel structural combination which provides for the stable support of an arched cover or roof independently of the stands or supports for not only the live rail sections, but also for the dead rail sections so that the cover or roof is not affected in any way when the load passes over the scale.

A further object of the invention is to provide a weather cover structure for scales which not only will thoroughly exclude water from the scale pit without the use of pipes or drain collectors of any kind, but which will also provide an extensive and ample ventilation for the scale pit, thus preventing sweating of the interior of the scale.

Other objects of the invention will appear to those skilled in this art as the details of this improvement are more fully described, illustrated and claimed, and though the essential features of the improvement are necessarily susceptible of a wide range of structural modification, a preferred and practical embodiment is shown in the accompanying drawings, in which:—

Figure 1 is an enlarged detail plan view of the improved cover structure showing the self-draining roof partly broken away to expose the mounting and arrangement of the several beams which respectively support the roof, the live rail stands and the dead rail stands.

Figure 2 is a cross sectional view of the cover structure, the line of section including the supports for the live rails and being indicated by the section line 2—2 on Figure 1.

Figure 3 is a cross sectional view on the broken line of section 3—3 of Figure 1, more clearly exposing the relative arrangement of the rafter or roof supporting beams and the supporting beams for the dead rail stands.

Figure 4 is a staggered longitudinal sectional view indicated by the line 4—4 on Figure 1 of the drawings, showing the mounting of both the live and dead rail stands independently of the roof and the means for supporting the latter.

Figure 5 is an enlarged detail view of one of the rail stands and the immediately associated parts.

Figure 6 is a detail plan view showing the track lay-out, particularly the mounting and arrangement of the scale tracks and the approach tracks.

Figure 7 is a vertical sectional view on the line 7—7 of Figure 6.

Figure 8 is a detail view of a tell-tale device.

In carrying forward the invention, the primary feature to be preserved is that of combining with a crowned roof or cover for the scale pit, a novel construction and arrangement of parts for supporting both live and dead rails over the crowned roof or cover and entirely independent of the latter and its supporting means so that the roof is not subject in any way to the load strains passing over the scale. At the same time, it is proposed to so combine these related parts that the crowning of the roof may be utilized to completely drain the cover from beneath both the live and dead rails and around the supports therefor out to the sides and ends of the scale pit without the possibility of water entering the scale pit, and without the necessity of utilizing any auxiliary water conductors, drain collectors, or other supplemental expedients, as heretofore employed. By way of illustrating the claimed improvements, reference is made to the accompanying drawings, in which the reference numeral 1 designates the scale pit, usually of permanent concrete construction and having the upstanding side and end abutment walls 2 and 3 respectively. The scale mechanism designated generally by the reference letter S, is housed within the scale pit and may be of any approved design or construction without affecting the present invention, the purpose of which is to thoroughly protect the scale mechanism from outside weather conditions by providing an adequate weather cover therefor, while at the same time solving the problem of the desirable use of dead rail tracks over the scale. Accordingly, a feature of the invention is to provide a weather cover for the open top of the scale pit. This cover is designated generally by the reference letter C and the same is of a slightly greater width and length than the corresponding dimensions of the scale pit so as not only to entirely cover the open top of the scale pit but also having a projection beyond the sides and ends of the scale pit, at the top thereof, in order that the water will drain from the cover to and beyond the sides as well as the ends of the pit. To obtain the water drainage function for the weather cover C, the same is of a transversely arched or crowned formation with its peak 4 extending along the longitudinal center thereof, the crowning or arching being at a sufficient inclination both ways laterally from the longitudinal peak 4 to provide a well defined watershed over which the water will freely flow toward the edges and ends of the scale pit.

The crowned or transversely arched cover C has no supporting function with either the live or the dead rails and therefore serves entirely as a water shedding roof to the scale pit, and this roof may be of any suitable or approved construction but may be advantageously constructed as best seen in Figures 2 and 5 of the drawings, wherein the roof is shown as being made up of superimposed layers of planking 5 and 6 with an interposed protective sheathing 7 of tar paper or equivalent material, and a mastic or equivalent top surfacing 8. A roof so constructed has substantial structural strength while at the same time possessing permanence and durability under all weather conditions.

The support of the cover or roof is provided for entirely independently of the supports for any other parts, and a simple and practical form of construction for that purpose is shown in the drawings as consisting of a series of rafter joists or beams 9 whose ends are seated on supporting shoulders 10 at the upper inner edges of the side abutments 2 of the scale pit. The rafter joists 9 extend transversely across the scale pit at the top, above all of the mechanism therein and are provided with transversely crowned or arched top edges 11 corresponding to the crowning or arching of the cover and directly supporting the latter, thus completing a substantial and stable cover or roof, capable of meeting any of the conditions to which it is subjected in service.

As pointed out, the present invention is intended to permit of the employment of not only the live track rails 12, for the scale mechanism, but also of the employment of dead track rails 13. Both the live track rails and the dead track rails are supported in an elevated position above the cover and in such relation to each other as to permit of the cover draining the water out to the sides and ends of the scale pit cover without the aid of auxiliary means. Referring to the mounting of the live track rails 12, each of said rails is carried upon a series of vertically movable live rail stands 14 preferably consisting of structural castings operating through clearance openings 15 provided in the cover or roof structure, said clearance openings being of a slightly larger size than the rail stands so as not to interfere with the freedom of movement thereof. Each of the rail stands 14 is provided at its upper end projecting above the top of the cover or roof with a rail chair 16 upon which the rail is seated and in connection with which may be associated suitable rail fastenings 17 such as clips. Also each of the said rail supporting stands 14 is preferably formed at the top thereof with the depending umbrella hoods or skirts 18 which surround an upstanding guard flashing 19 secured to the cover or roof around the top of the clearance opening 15 and projecting a sufficient distance above the cover or roof to positively prevent water, snow or ice from entering into the pit through the opening 15. The umbrella hood 18 extends well down on the outside of the flashing 19 so as to quite effectually protect the same from the water, and furthermore the hoods 18 being relatively thin would necessarily cut their way into an accumulation of snow or ice so that the latter would not interfere with the movement of the live rail stands 14 when the load is imposed on the live rails.

The live rail stands 14 are illustrated as being of cross or star form in cross section, for purposes of lightness and strength, though that detail may be changed without affecting the invention, but at their lower ends the stands 14 are provided with the base plates 20 having a seat upon the scale beams 21 forming a part of the scale mechanism, through which beams the load is transmitted to the scale mechanism.

The dead track rails 13 are supported similarly to the live track rails 12, with the exception that the dead rail supports, of course, have no connection with the scale mechanism, that is to say, each dead rail is carried upon a series of dead rail supporting stands 22 which preferably are duplicates of the live rail supporting stands 14 and are of the same size, thus effecting economies and uniformity in manufacture. Therefore, each of the dead rail supporting stands 22 is provided at its upper end with the rail supporting chair and the umbrella hood previously referred to, the umbrella hoods carried by the dead rail supporting stands cooperating with guard flashings 19$^a$, around the upper edges of the clearance openings 23 Fig. 4 provided in the cover or roof and through which openings 23 the stands 22 project. The guard flashings 19$^a$ around the clearance openings 23 prevent the entrance of water through such openings, while the latter permit the supporting and mounting of the dead rail stands entirely independently of the cover or roof so that the latter is relieved entirely of the load passing over the scale. The lower ends of the dead rail stands are also provided with the base plates 20$^a$ which are seated upon stationary rail supporting beams 24 extending transversely across the top portion of the scale pit beneath the cover or roof and seated at their ends on the supporting shoulders 25 provided in and on the side abutments 2 of the scale pit. It will, therefore, be seen that each of the dead rails 13 is supported in an elevated position above the cover or roof upon supporting stands which are in turn supported on stationary supports within the scale pit and below the cover or roof so that the load which may be taken on the dead rails, is carried upon a series of very substantial supports which are in turn supported from the solid wall structure of the scale pit itself.

Another feature of the invention is that of arranging the supporting stands for the line and dead rails in spaced staggered relation so that there is proper clearance and spacing between and around all the umbrella joints which surround the clearance openings for the rail supporting stands. By reason of this arrangement of parts, the crowning or arching of the cover or roof functions fully throughout so that all water will readily run from its surface toward and beyond the ends and sides of the scale pit.

Another feature of practical importance which will be recognized by those familiar with this art, is that of the extensive and thorough ventilation of the scale pit afforded by the large number of clearance openings provided in the cover or roof for both the live and dead rail supporting stands. This extensive ventilation is of importance to prevent sweating of the interior of the scale and maintaining the operating parts in good working order.

In Figures 6 and 7 of the drawings is shown a practical feature rendered possible by the novel manner in which it is proposed to mount the dead rail stands independently of the cover and independently of all other supports. That feature is the one of carrying the two sets of approach track rails 12$^a$—12$^a$ and 13$^a$—13$^a$ over the ends of the cover C and supporting the same upon stationary rail supporting stands 22$^a$, arranged in pairs and extending through clearance openings in the cover so as to be supported by the stationary supporting beams 24$^a$ seated on shoulders on the side walls or abutments of the scale pit. These stationary rail supporting stands 22$^a$ which extend through the cover C, so as to provide supports for the approach rails 12$^a$ and 13$^a$ take the load on the said rails up to the point where a live rail stand can take an operative bearing on a beam of the scale.

Attention is drawn to a further advantage of mounting both the live and dead track rails in such a manner that the cover or roof is not affected by the loads passing over the same. By reason of such a structure, it is possible to utilize an electric signaling device to indicate in the weigh-house the condition of the scale, that is, to give indications to the operator that his scale is in balance or out of balance. This may be accomplished in various ways, for instance as shown in Figure 8, by attaching stationary electrical contacts $a$ on the stationary cover to engage with moving contacts $b$ carried by the moving live rail stands 14, said contacts to be included in a simple wiring circuit $c$—$c$ connected with a lamp or any other kind of an indicator $d$ which will carry the desired indications to the operator, the reference letter $e$ designating the source of electrical energy.

I claim:

1. A weather cover for scale pits including in combination with the scale pit walls, rafter joists seated on said walls, a roof supported on said joists, a scale member carrying live rail supports projecting through the roof and supporting live rails thereover, stationary supporting beams seated on the pit walls beneath the roof and dead rail supports carried by said stationary supporting beams and projecting through the cover and carrying dead rails above the same.

2. A weather cover for track scale pits including a roof, spaced live rail-carrying stands projecting through the roof and supporting the live rails in an elevated position above the same, and spaced dead rail stands having a support independent of the roof and arranged to support the dead rails in an elevated position above the roof, and means individual to each live and dead rail stand for preventing the entry of water and the like through the openings in the roof and through which the rail stands project.

3. A weather cover for track scale pits including a roof having clearance openings therein, spaced live rail supporting stands projecting through certain of said clearance openings, spaced dead rail supporting stands projecting through other of said clearance openings, and water excluding joints arranged about each opening for the live and dead rail stands.

4. A weather cover for scale pits including a roof provided with openings therein, live rail stands projecting through certain of said openings and holding the live rails in an elevated position above the roof, dead rail stands supported independently of the roof and projecting through other of said openings to hold the dead rails in an elevated position above the roof, the said stands for the live and dead rails being disposed in spaced relation leaving unobstructed drain spaces beneath all of the rails and between said stands, and water excluding joints located at all of the clearance openings.

5. In a weather cover structure for scale pits, in a combination with a pair of approach tracks having their rails extend over an end of the scale pit, a roof arranged to entirely cover the scale pit, live and dead track rails arranged over the roof in line with the respective approach track rails, live and dead rail supporting stands supported from beneath the roof and independently thereof and arranged to respectively support the said live and dead track rails, and separate sets of stationary rail supporting stands supported from beneath the roof independently thereof and arranged to support the ends of the approach track rails overlying the roof.

In testimony whereof I hereunto affix my signature in the presence of two witnesses.

JOHN W. ORROCK.

Witnesses:
 I. COWAN,
 J. WARREN.